United States Patent
An et al.

(10) Patent No.: US 9,984,821 B2
(45) Date of Patent: May 29, 2018

(54) MULTILAYER CERAMIC CAPACITOR

(71) Applicant: SAMSUNG ELECTRO-MECHANICS CO., LTD., Suwon-si, Gyeonggi-do (KR)

(72) Inventors: Sung Yong An, Suwon-si (KR); Kang Ryong Choi, Suwon-si (KR); Jae Yeong Kim, Suwon-si (KR); Yong Hui Li, Suwon-si (KR); Byeong Cheol Moon, Suwon-si (KR); Jeong Gu Yeo, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 7 days.

(21) Appl. No.: 15/052,241

(22) Filed: Feb. 24, 2016

(65) Prior Publication Data

US 2017/0084392 A1    Mar. 23, 2017

(30) Foreign Application Priority Data

Sep. 17, 2015    (KR) .................. 10-2015-0131632

(51) Int. Cl.
| | |
|---|---|
| *H01G 4/30* | (2006.01) |
| *H01G 4/12* | (2006.01) |
| *H01G 4/008* | (2006.01) |
| *H01G 4/01* | (2006.01) |

(52) U.S. Cl.
CPC .......... *H01G 4/1218* (2013.01); *H01G 4/008* (2013.01); *H01G 4/01* (2013.01); *H01G 4/30* (2013.01)

(58) Field of Classification Search
CPC ........................................ H01G 4/30
See application file for complete search history.

(56) References Cited

U.S. PATENT DOCUMENTS

| | | | |
|---|---|---|---|
| 2010/0194331 A1 | 8/2010 | Lai et al. | |
| 2012/0099240 A1* | 4/2012 | Chang | H01G 4/002 361/301.1 |
| 2017/0186549 A1* | 6/2017 | Kurokawa | H01G 4/30 |

FOREIGN PATENT DOCUMENTS

| | | | |
|---|---|---|---|
| JP | 06290991 A | * | 10/1994 |
| JP | 07235450 A | * | 9/1995 |
| KR | 10-2010-0090206 A | | 8/2010 |

* cited by examiner

*Primary Examiner* — Eric Thomas
(74) *Attorney, Agent, or Firm* — McDermott Will & Emery LLP

(57) ABSTRACT

A multilayer ceramic capacitor includes an active region including a plurality of dielectric layers, and first and second internal electrodes alternately disposed with each of the dielectric layers interposed therebetween; and upper and lower cover regions including at least one ferromagnetic layer and disposed on and below the active region, respectively.

13 Claims, 3 Drawing Sheets

A-A'

MULTILAYER CERAMIC CAPACITOR

CROSS-REFERENCE TO RELATED APPLICATION

This application claims the benefit of priority to Korean Patent Application No. 10-2015-0131632, filed on Sep. 17, 2015 with the Korean Intellectual Property Office, the disclosure of which is incorporated herein by reference.

TECHNICAL FIELD

The present disclosure relates to a multilayer ceramic capacitor.

BACKGROUND

An example of an electronic component using ceramic material includes a capacitor, an inductor, a piezoelectric element, a varistor, a thermistor, and the like.

A multilayer ceramic capacitor (MLCC), a ceramic electronic component, has advantages such as compact size, high capacitance, and ease of mounting.

A multilayer ceramic capacitor is a chip type condenser mounted on boards of several electronic products such as display devices including liquid crystal displays (LCDs), plasma display panels (PDPs), and the like, computers, personal digital assistants (PDAs), mobile phones, and the like, and serves to charge and discharge electricity.

Meanwhile, in accordance with an increase in the capacitance of electronic products, a capacitor used in electronic products has also been required to have high capacitance.

In order to increase the capacitance of the capacitor, the number of stacked internal electrodes should be increased. However, in accordance with the miniaturization of electronic products, space in which the capacitor is installed is limited, and thus there is a limitation to increasing the size of the capacitor. As a result, there is a limitation in increasing the number of stacked internal electrodes, and thus there is a limitation in increasing the capacitance of the capacitor.

SUMMARY

An aspect of the present disclosure may provide a multilayer ceramic capacitor of which capacitance may be increased without increasing the number of stacked internal electrodes as compared to an existing product.

According to an aspect of the present disclosure, a multilayer ceramic capacitor may include: an active region including a plurality of dielectric layers, and first and second internal electrodes alternately disposed with each of the dielectric layers interposed therebetween; and upper and lower cover regions including at least one ferromagnetic layer and disposed on and below the active region, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Terms with respect to directions of a hexahedron will be defined in order to clearly describe exemplary embodiments. L, W, and T illustrated in FIG. 1 refer to a length direction, a width direction, and a thickness direction, respectively. Here, the thickness direction may be the same as a stacking direction in which dielectric layers and ferromagnetic layers are stacked.

Multilayer Ceramic Capacitor

Figure 1:
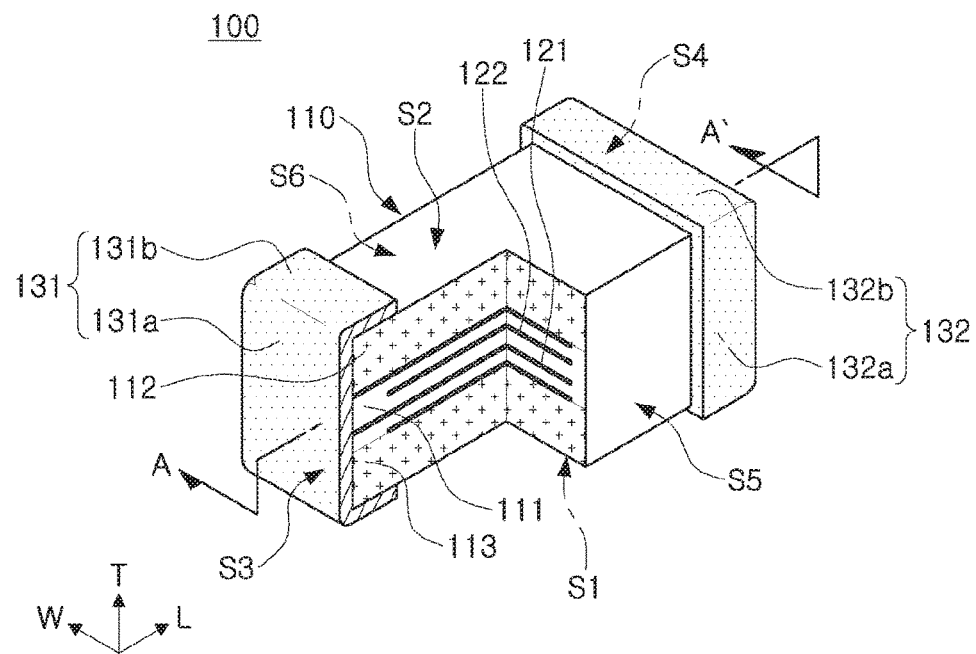
FIG. 1 is a perspective view schematically illustrating a multilayer ceramic capacitor according to a first exemplary embodiment in the present disclosure.
Figure 2:
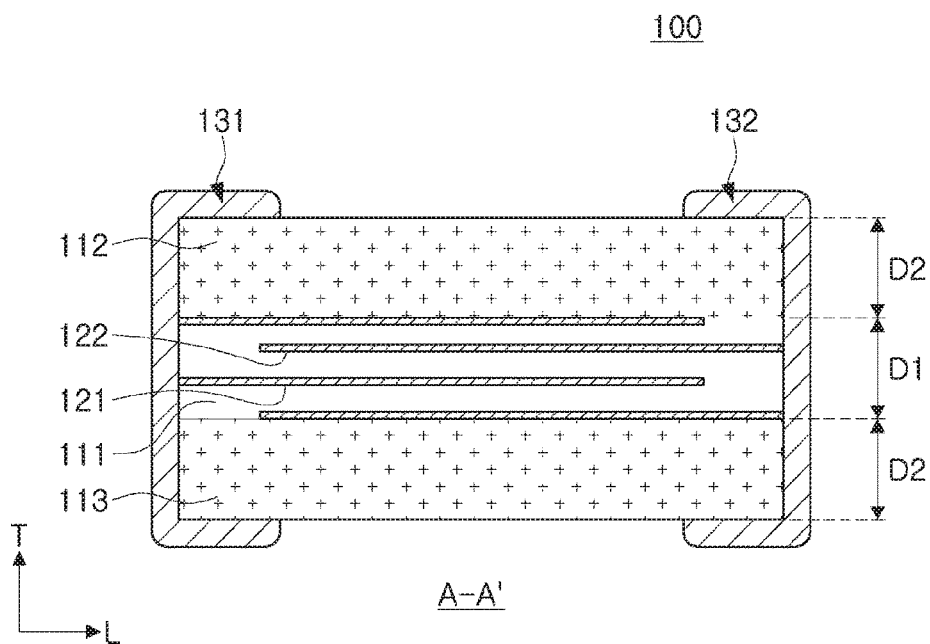
FIG. 2 is a cross-sectional view taken along line A-A' of FIG. 1.

FIG. 1 is a perspective view schematically illustrating a multilayer ceramic capacitor according to a first exemplary embodiment, and FIG. 2 is a cross-sectional view taken along line A-A' of FIG. 1.

Referring to FIGS. 1 and 2, a multilayer ceramic capacitor 100 according to the present exemplary embodiment may include a body 110 and first and second external electrodes 131 and 132.

The body 110 may have first and second surfaces S1 and S2 opposing each other in a thickness direction, third and fourth surfaces S3 and S4 connecting the first and second surfaces S1 and S2 to each other and opposing each other in a length direction, and fifth and sixth surfaces S5 and S6 opposing each other in a width direction.

Hereinafter, in the present exemplary embodiment, a description will be provided on the assumption that amounting surface of the multilayer ceramic capacitor 100 is the first surface S1 of the body 110.

The body 110 may include an active region D1 positioned at the center thereof in the thickness direction, and upper and lower cover regions D2 disposed on and below the active region D1, respectively, and may have a hexahedral shape as illustrated in FIG. 1, but is not particularly limited thereto.

The active region D1, which is a portion contributing to forming capacitance of the capacitor, may include a plurality of dielectric layers 111 and first and second internal electrodes 121 and 122 alternately disposed with each of the dielectric layers 111 interposed therebetween.

The plurality of dielectric layers 111 may be stacked in the thickness direction and may be in a sintered state, and adjacent dielectric layers 111 may be integrated with each other so that boundaries therebetween are not readily apparent without using a scanning electron microscope (SEM).

In addition, the dielectric layer 111, which is a ferroelectric layer, may contain high-k ceramic powder, such as at least one of barium titanate ($BaTiO_3$) based powder, strontium titanate ($SrTiO_3$) based powder, and $CaCu_3Ti_4O_{12}$, e.g., at least one of $Sr_2FeMoO_6$, $(LaCa)MnO_3$, $(LaSr)MnO_3$, $(LaBa)MnO_3$, $(PrCa)MnO_3$, $SrNbO_3$, $La_2MnO_3$, $BiMnO_3$, $YMnO_3$, $TbMnO_3$, $Bi_2NiMnO_6$, $La_2FeCrO_6$, $Bi_2FeCrO_6$, $CuCr_2Se_4$, $CdCr_2Se_4$, $CdCr_2S_4$, $La_2NiMnO_6$, and Bi$_2$NiMnO$_6$. However, a material of the dielectric layer 111 is not limited thereto, as long as sufficient capacitance may be obtained.

In addition, the dielectric layer 111 may further contain ceramic additives, organic solvents, plasticizers, binders, dispersants, and the like, if necessary, in addition to the ceramic powder.

The upper and lower cover regions D2 may be disposed on and below the active region D1, respectively, and may include at least one ferromagnetic layer 112 or 113 stacked in the thickness direction.

These upper and lower cover regions D2 as described above may basically serve to prevent first and second internal electrodes 121 and 122 included in the active region D1 from being damaged by physical or chemical stress.

Further, the ferromagnetic layers 112 and 113 may contain at least one selected from Fe, Co, Ni, FePt, CoPt, FeCoNi, Nd$_2$Fe$_{14}$B, BaFe$_{12}$O$_{19}$, SrFe$_{12}$O$_{19}$, SmCo$_5$, and Sm$_2$Fe$_{17}$. Here, Fe, Co, and Ni, which are metals, are ferromagnetic materials containing a single ingredient, and FePt, CoPt, FeCoNi, and the like, which are metal alloys of Fe, are ferromagnetic materials. Nd$_2$Fe$_{14}$B, BaFe$_{12}$O$_{19}$, SrFe$_{12}$O$_{19}$, SmCo$_5$, and Sm$_2$Fe$_{17}$ are materials of a permanent magnet, and magnetic field intensities thereof may be significantly larger than those of the metals described above.

Here, preferably, the ferromagnetic layers 112 and 113 may have coercive force of 100 Oe or greater. When the ferromagnetic layers 112 and 113 have coercive force of 100 Oe or less as described above, since these layers correspond to soft magnetic layers rather than ferromagnetic layers, a magnetic field may not suitably reach a dielectric material or multiferroics.

The first external electrode 131 may include a first connection portion 131a formed on the third surface S3 of the body 110 and a first band portion 131b extending from the first connection portion 131a to portions of the first, fifth, and sixth surfaces S1, S5, and S6 of the body 110, respectively.

The second external electrode 132, which is an electrode applied with electricity having a different polarity from the first external electrode 131, may include a second connection portion 132a formed on the fourth surface S4 of the body 110 and a second band portion 132b extending from the second connection portion 132a to portions of the first, fifth, and sixth surfaces S1, S5, and S6 of the body 110, respectively.

Here, in the first external electrode 131, the first band portion 131b may further extend from the first connection portion 131a to a portion of the second surface S2 of the body 110.

In the second external electrode 132, the second band portion 132b may further extend from the second connection portion 132a to a portion of the second surface S2 of the body 110.

When the internal and external electrodes of the multilayer ceramic capacitor 100 are formed to have vertically symmetrical structures as described above, directionality of the capacitor may be removed.

Therefore, since any surface of the first and second surfaces S1 and S2 of the multilayer ceramic capacitor 100 may be provided as amounting surface, when the multilayer ceramic capacitor 100 is mounted on a board, there is no need to consider a direction of the mounting surface.

Meanwhile, if necessary, first and second plating layers (not illustrated) may be formed on the first and second external electrodes 131 and 132, respectively.

The first and second plating layers may include first and second nickel (Ni) plating layers each formed on the first and second external electrodes 131 and 132, and first and second tin (Sn) plating layers each formed on the first and second nickel plating layers.

The first and second internal electrodes 121 and 122, which are electrodes applied with voltages having different polarities from each other, may be disposed in the active region D1 of the body 110 with each of the dielectric layers 111 interposed therebetween to be alternately exposed to the third and fourth surfaces S3 and S4 of the body.

Therefore, a portion of the first internal electrode 121 exposed to the third surface S3 of the body may contact the first connection portion 131a of the first external electrode 131 to thereby be electrically connected thereto, and a portion of the second internal electrode 122 exposed to the fourth surface S4 of the body 110 may contact the second connection portion 132a of the second external electrode 132 to thereby be electrically connected thereto.

In this case, the first and second internal electrodes 121 and 122 may be electrically insulated from each other by the dielectric layer 111 disposed therebetween.

In addition, a material forming the first and second internal electrodes 121 and 122 is not particularly limited. For example, the first and second internal electrodes 121 and 122 may be formed using a conductive paste formed of at least one of silver (Ag), copper (Cu), nickel (Ni), tin (Sn), indium oxide (ITO), palladium (Pd), and a silver-palladium (Ag—Pd) alloy.

As a printing method of the conductive paste, a screen printing method, a gravure printing method, or the like, may be used, but the printing method is not limited thereto.

In a multilayer ceramic capacitor, excluding internal and external electrodes, formed only of dielectric layers according to the related art, capacitance C may be increased by decreasing a thickness d of the dielectric layer and increasing an area A of internal electrodes as represented by the following Equation 1. However, since a size of the capacitor is limited, there is a limitation in decreasing the thickness d of the dielectric layer or increasing the area A of the internal electrodes. According to the present exemplary embodiment, capacitance may be increased by increasing relative permittivity $\in_r$ of the dielectric material without changing a size of the multilayer ceramic capacitor.

$$C = \in_0 \cdot \in_r \cdot A/d \qquad \text{Equation 1}$$

According to the present disclosure, capacitance of the multilayer ceramic capacitor may be increased by the fact that magnetostrictive strain generated by an external magnetic field increases permittivity.

In more detail, as magnetic spin is aligned in crystal orientation in a direction of an applied magnetic field, a lattice constant may be changed, thereby inducing magnetostriction. Therefore, distortion of the dielectric layer is generated by magnetostrictive strain, and thus permittivity may be increased.

According to the present exemplary embodiment, when a magnetic field is externally applied to the upper and lower cover regions D2, magnetostriction of the ferromagnetic layers 112 and 113 may be generated by the applied magnetic field. At this time, length deformation such as elongation or contraction of a crystalline structure of the dielectric layer may occur, and thus electric stress may be induced in an interface with the active region D1 due to a change in the crystalline structure.

In addition, magnetostriction may be generated in the dielectric layer 111 due to the electric stress as described above, and distortion of the dielectric layer may be generated due to the magnetostriction as described above, and thus permittivity may be increased, and capacitance of the multilayer ceramic capacitor 100 may be increased.

Modified Exemplary Embodiment

Figure 3:
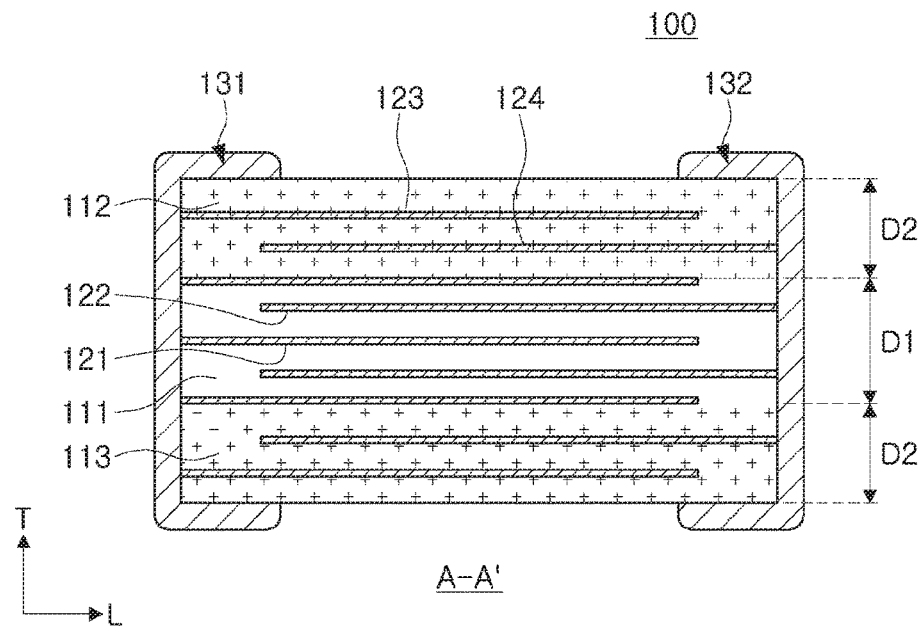
FIG. 3 is a cross-sectional view schematically illustrating a multilayer ceramic capacitor according to a second exemplary embodiment in the present disclosure.

FIG. 3 is a cross-sectional view schematically illustrating a multilayer ceramic capacitor according to a second exemplary embodiment.

Here, since structures of an active region D1, upper and lower cover regions D2, first and second internal electrodes 121 and 122, and first and second external electrodes 131 and 132 are the same as those in the exemplary embodiment as described above, a detailed description thereof will be omitted in order to avoid an overlapping description. Here, third and fourth internal electrodes 123 and 124 having a structure different from that in the exemplary embodiment described above will be described in detail with reference to FIG. 3.

Referring to FIG. 3, the multilayer ceramic capacitor according to the second exemplary embodiment may further include third and fourth internal electrodes 123 and 124 disposed in the upper or lower cover region D2 with each of the ferromagnetic layers 112 or 113 interposed therebetween to be alternately exposed to third and fourth surfaces S3 and S4 of a body 110.

Therefore, a portion of the third internal electrode 123 exposed to the third surface S3 of the body 110 may contact the first connection portion 131a of the first external electrode 131 to thereby be electrically connected thereto, and a portion of the fourth internal electrode 124 exposed to the fourth surface S4 of the body 110 may contact the second connection portion 132a of the second external electrode 132 to thereby be electrically connected thereto.

Here, the third and fourth internal electrodes 123 and 124 may be electrically insulated from each other by the ferromagnetic layer 112 or 113 interposed therebetween.

In addition, a material forming the third and fourth internal electrodes 123 and 124 is not particularly limited. For example, the third and fourth internal electrodes 123 and 124 may be formed using a conductive paste formed of at least one of silver (Ag), copper (Cu), nickel (Ni), tin (Sn), indium oxide (ITO), palladium (Pd), and a silver-palladium (Ag—Pd) alloy.

As a printing method of the conductive paste, a screen printing method, a gravure printing method, or the like, may be used, but the printing method is not limited thereto.

Figure 4:
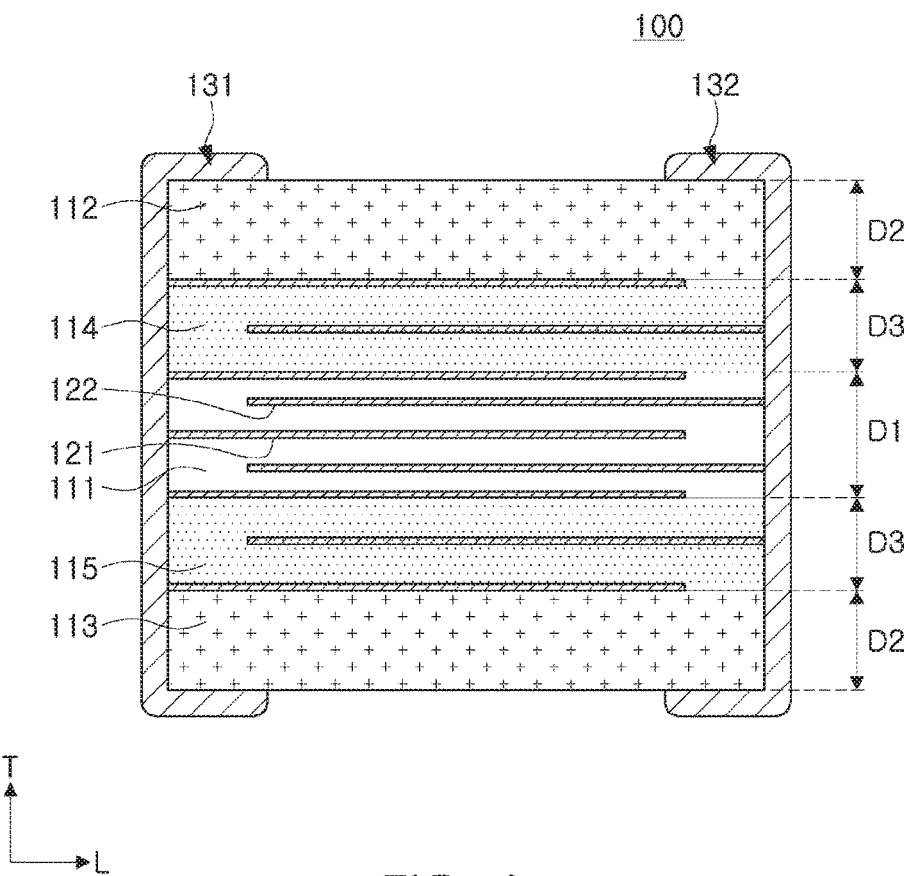
FIG. 4 is a cross-sectional view schematically illustrating a multilayer ceramic capacitor according to a third exemplary embodiment in the present disclosure.
Figure 5:
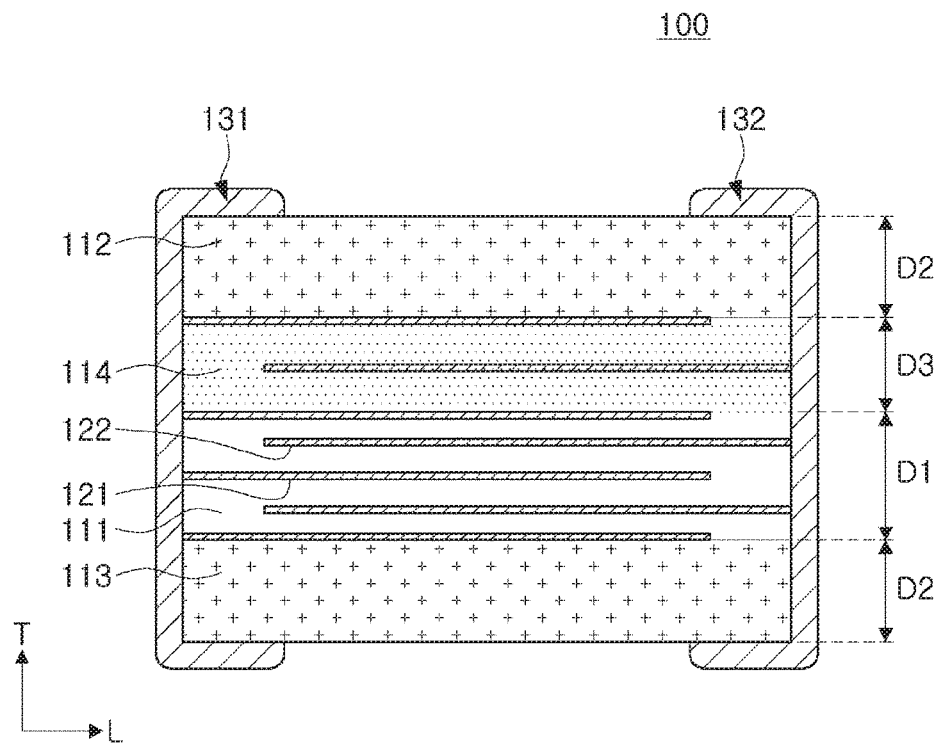
FIG. 5 is a cross-sectional view schematically illustrating a multilayer ceramic capacitor according to a fourth exemplary embodiment in the present disclosure.
Figure 6:
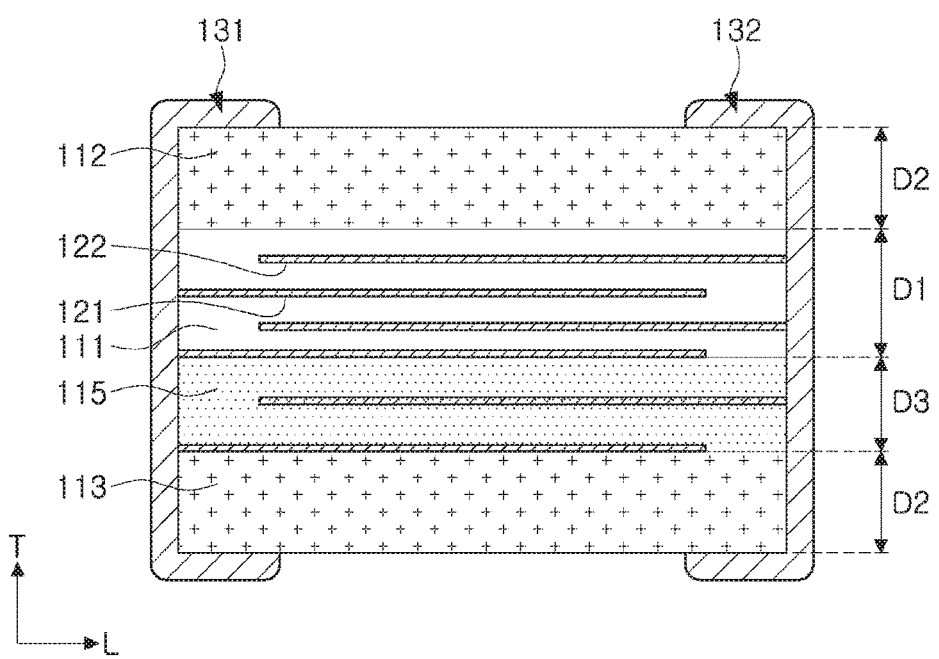
FIG. 6 is a cross-sectional view schematically illustrating a multilayer ceramic capacitor according to a fifth exemplary embodiment in the present disclosure.

FIGS. 4 through 6 are cross-sectional views schematically illustrating multilayer ceramic capacitors according to third to fifth exemplary embodiments.

Here, since structures of an active region D1, upper and lower cover regions D2, first and second internal electrodes 121 and 122, and first and second external electrodes 131 and 132 are the same as those in the exemplary embodiment as described above, a detailed description thereof will be omitted in order to avoid an overlapping description. Here, a multiferroic layer region D3 having a structure different from that in the exemplary embodiment described above will be described in detail with reference to FIGS. 4 through 6.

Referring to FIG. 4, in the multilayer ceramic capacitor according to the present exemplary embodiment, the multiferroic layer region D3 in which at least one multiferroic layer 114 or 115 is stacked may be disposed between the active region D1 and the upper and lower cover regions D2, and may serve to improve permittivity.

The multiferroic layers 114 and 115 may simultaneously exhibit magnetic properties and dielectric properties, and may contain at least one of La—Sr (or Ba, Ca)—Mn—O based perovskite materials, $La_2NiO_4$, $LaSrNiO_4$, and $Ba_2Co_2Fe_{12}O_{22}$. For example, the multiferroic layers 114 and 115 may contain at least one of $LaSrMnO_3$, $LaBrMnO_3$, $LaCaMnO_3$, $La_2NiO_4$, $LaSrNiO_4$, and $Ba_2Co_2Fe_{12}O_{22}$.

Here, the multiferroic layer region D3 may be disposed only between the active region D1 and the upper cover region D2 as illustrated in FIG. 5. Alternatively, the multiferroic layer region D3 may be disposed only between the active region D1 and the lower cover region D2 as illustrated in FIG. 6.

As set forth above, according to exemplary embodiments, since capacitance of the capacitor may be increased without increasing the number of stacked internal electrodes as compared to the existing product, the multilayer ceramic capacitor securing high capacitance while having a compact size may be provided.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
    a body including:
        first and second end surfaces opposing each other, and third and fourth side surfaces opposing each other and connecting the first and second end surfaces;
        an active region including a plurality of dielectric layers, and first and second internal electrodes alternately disposed with one of the dielectric layers interposed therebetween and exposed to the first and second end surfaces, respectively; and
        a ferromagnetic layer disposed on the active region;
    a first external electrode including a first connection portion disposed on the first end surface and electrically connected the first internal electrodes and a first band portion extending to the third and fourth side surfaces;
    a second external electrode including a second connection portion disposed on the second end surface and electrically connected the second internal electrodes and a second band portion extending to the third and fourth side surfaces; and
    a multiferroic region including at least one multiferroic layer and disposed between the active region and the ferromagnetic layer,
    wherein the first and second band portions are in contact with the ferromagnetic layer, and
    the at least one multiferroic layer contains at least one of $LaSrMnO_3$, $LaBrMnO_3$, $LaCaMnO_3$, $La_2NiO_4$, $LaSrNiO_4$, and $Ba_2Co_2Fe_{12}O_{22}$.

2. The multilayer ceramic capacitor of claim 1, further comprising third and fourth internal electrodes alternately disposed in the ferromagnetic layer.

3. The multilayer ceramic capacitor of claim 1, wherein the plurality of dielectric layers contain at least one of $BaTiO_3$, $CaTiO_3$, $SrTiO_3$, $CaCu_3Ti_4O_{12}$, $Sr_2FeMoO_6$, $(LaCa)MnO_3$, $(LaSr)MnO_3$, $(LaBa)MnO_3$, $(PrCa)MnO_3$, $SrNbO_3$, $La_2MnO_3$, $BiMnO_3$, $YMnO_3$, $TbMnO_3$, $Bi_2NiMnO_6$, $La_2FeCrO_6$, $Bi_2FeCrO_6$, $CuCr_2Se_4$, $CdCr_2Se_4$, $CdCr_2S_4$, $La_2NiMnO_6$, and $Bi_2NiMnO_6$.

4. The multilayer ceramic capacitor of claim 1, wherein the ferromagnetic layer contains at least one of Fe, Co, Ni, FePt, CoPt, FeCoNi, $Nd_2Fe_{14}B$, $BaFe_{12}O_{19}$, $SrFe_{12}O_{19}$, $SmCo_5$, and $Sm_2Fe_{17}$.

5. The multilayer ceramic capacitor of claim 1, wherein the ferromagnetic layer has coercive force of 100 Oe or greater.

6. The multilayer ceramic capacitor of claim 1, wherein the first and second internal electrodes contain at least one of silver (Ag), copper (Cu), nickel (Ni), tin (Sn), indium oxide (ITO), palladium (Pd), and a silver-palladium (Ag—Pd) alloy.

7. The multilayer ceramic capacitor of claim 1, wherein the at least one multiferroic layer has magnetic properties and dielectric properties, and
the at least one multiferroic layer and the ferromagnetic layer are formed of different materials.

8. A multilayer ceramic capacitor comprising:
a body including:
first and second end surfaces opposing each other, and third and fourth side surfaces opposing each other and connecting the first and second end surfaces;
an active region in which a plurality of dielectric layers are stacked, and first and second internal electrodes are alternately disposed with one of the dielectric layers interposed therebetween to be alternately exposed to the first and second end surfaces; and
first and second ferromagnetic layers, between which the active region is disposed;
a first external electrode including a first connection portion disposed on the first end surface and electrically connected the first internal electrodes and a first band portion extending to the third and fourth side surfaces;
a second external electrode including a second connection portion disposed on the second end surface and electrically connected the second internal electrodes and a second band portion extending to the third and fourth side surfaces; and
a multiferroic region in which at least one multiferroic layer is stacked and which is disposed between the active region and at least one of the first and second ferromagnetic layers,
wherein the first and second band portions are in contact with the first and second ferromagnetic layers, and
the at least one multiferroic layer contains at least one of La—Sr(or Ba, Ca)—Mn—O based perovskite materials, $La_2NiO_4$, $LaSrNiO_4$ and $Ba_2Co_2Fe_{12}O_{22}$.

9. The multilayer ceramic capacitor of claim 8, further comprising third and fourth internal electrodes disposed in at least one of the first and second ferromagnetic layers.

10. The multilayer ceramic capacitor of claim 8, further comprising third and fourth internal electrodes disposed in at least one of the first and second ferromagnetic layers, and
a multiferroic region in which at least one multiferroic layer is stacked and which is disposed between the active region and at least one of the first and second ferromagnetic layers.

11. The multilayer ceramic capacitor of claim 8, wherein the plurality of dielectric layers contain at least one of barium titanate (BaTiO3) based powder, strontium titanate ($SrTiO_3$) based powder, $CaCu_3Ti_4O_{17}$, and La—Sr—Ni—O based perovskite materials.

12. The multilayer ceramic capacitor of claim 8, wherein the first and second ferromagnetic layers contain at least one of Fe, Co, Ni, FePt, CoPt, FeCoNi, $Nd_2Fe_{14}B$, $BaFe_{12}O_{19}$, $SrFe_{12}O_{19}$, $SmCo_5$, and $Sm_2Fe_{17}$.

13. The multilayer ceramic capacitor of claim 8, wherein the at least one multiferroic layer has magnetic properties and dielectric properties, and
the at least one multiferroic layer and the first and second ferromagnetic layers are formed of different materials.

* * * * *